Feb. 9, 1932.  C. D. ELLIS  1,844,750
THRESHER
Filed Sept. 20, 1929  3 Sheets-Sheet 1
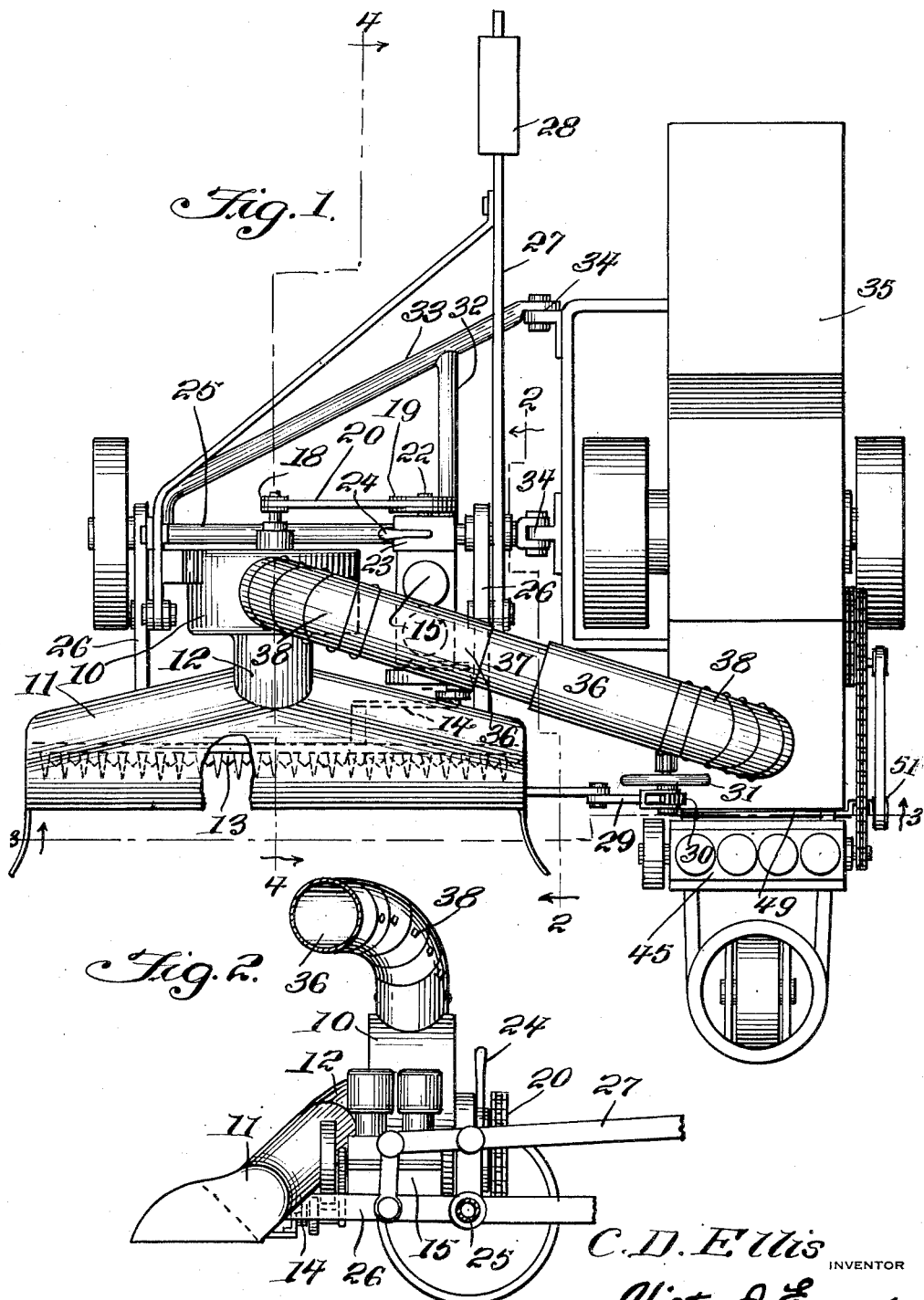

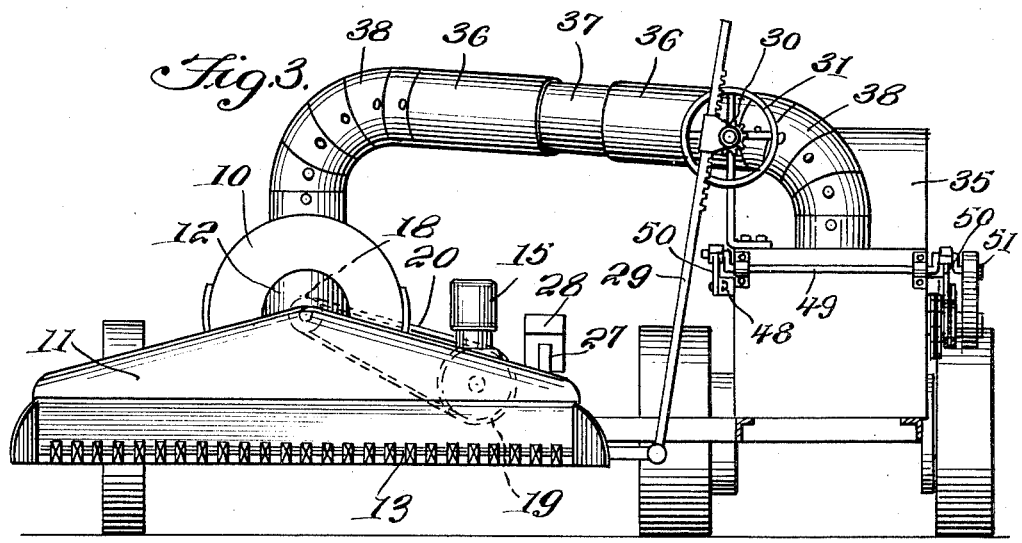

Feb. 9, 1932. C. D. ELLIS 1,844,750
THRESHER
Filed Sept. 20, 1929 3 Sheets-Sheet 3
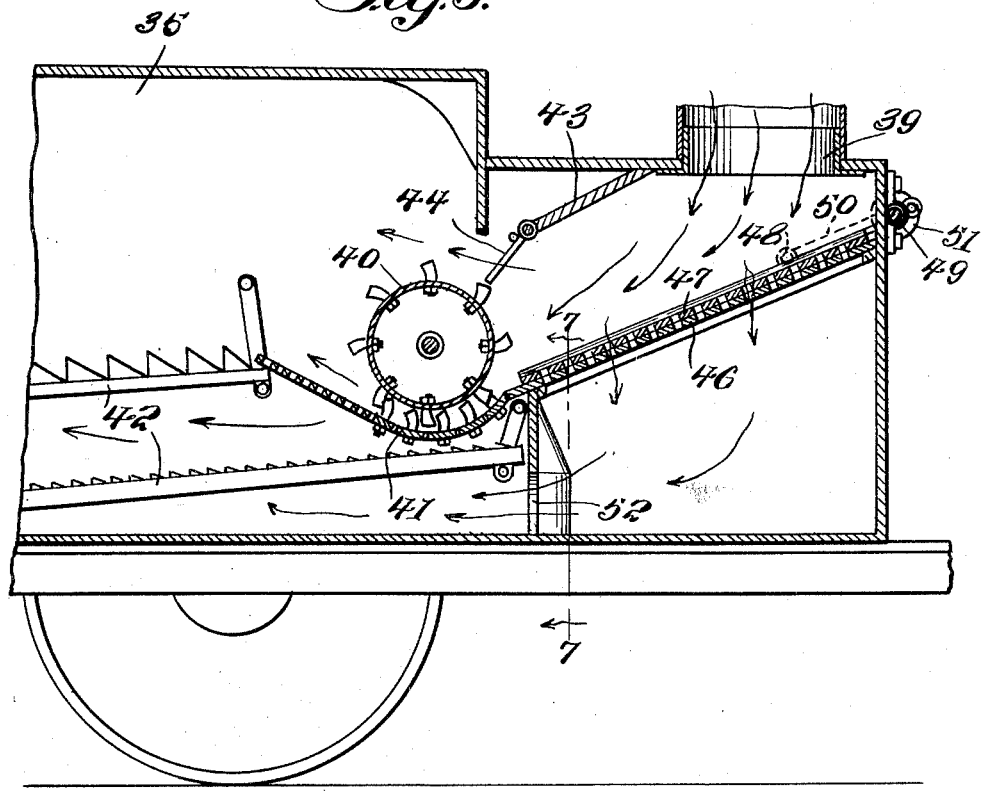
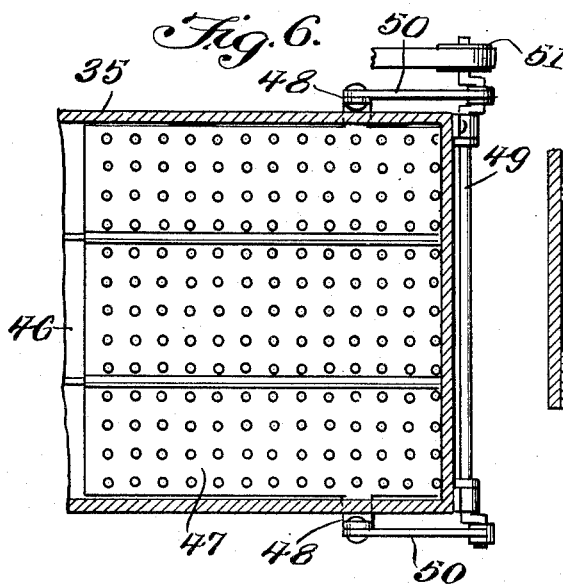
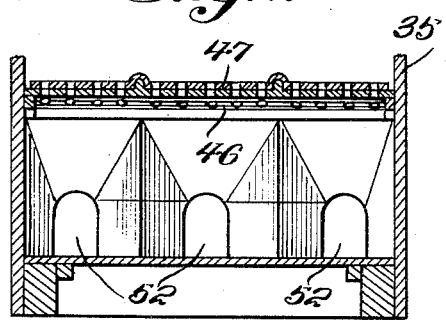
C. D. Ellis, INVENTOR
BY Victor J. Evans, ATTORNEY
WITNESS: J. T. L. Wright Patented Feb. 9, 1932

1,844,750

UNITED STATES PATENT OFFICE

CLEM D. ELLIS, OF BUCKLIN, KANSAS

THRESHER

Application filed September 20, 1929. Serial No. 394,008.

The present invention contemplates the provision of a combined harvester and threshing machine, wherein a suction is created to lift or elevate fallen grain from the ground, so that the latter as well as the upstanding grain can be quickly and conveniently cut, and subsequently conveyed to the thresher by air pressure, and wherein the grain is forced therethrough by said thresher.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views, and wherein:—

Figure 1 is a plan view.

Figure 2 is a sectional view on line 2—2 of Figure 1.

Figure 3 is a sectional view on line 3—3 of Figure 1.

Figure 4 is a sectional view on line 4—4 of Figure 1.

Figure 5 is a fragmentary sectional view through the thresher.

Figure 6 is a fragmentary sectional view showing the self cleaning screen.

Figure 7 is a sectional view on line 7—7 of Figure 5.

The machine constituting the subject matter of the present invention comprises a wheeled frame upon which is mounted a fan casing 10, which communicates with an elongated housing 11 by means of a short length of pipe indicated at 12. The housing 11 is preferably of the cross sectional configuration illustrated in Figure 2, to lie in close proximity to the ground, and is open at its bottom throughout its entire length. Operating within the housing 11 is a reciprocating cutting bar 13, which is operated by means of a piston 14 suitably connected with a motor 15. Arranged within the casing 10 is a fan 16, including a shaft 17 which projects beyond one side of the casing 10 and supports a pulley 18. Trained over this pulley and a larger pulley 19 is an endless belt 20, the pulley 19 being mounted on a shaft forming part of a motor indicated generally at 21. The shaft just mentioned is indicated at 22 and passes through a gear box 23, a gear operating lever being indicated at 24, so the speed of rotation of the fan can be regulated. The housing 11 and its associated parts is mounted for vertical adjustment toward and away from the ground on the axle 25, through the instrumentality of spaced supporting arms 26 as clearly illustrated in Figure 1, while carried by one end of the arm 27 is a counter-balancing weight indicated at 28. Consequently the housing 11 and the cutting bar 13 can be properly located or positioned with relation to the ground, and for the purpose of effecting this adjustment, I preferably employ a rack bar 29, the teeth of which engage a pinion 30 which is actuated by means of a hand wheel 31 as clearly illustrated in Figure 3.

In addition to this adjustment of the hood 11, it will be noted upon inspection of Figure 1 that the wheeled frame includes bars 32 and 33 respectively which are pivotally mounted at 34, so that this side of the machine including the housing 11 may be moved vertically when the machine traverses irregular ground or is moved over inclined surfaces.

Leading from the top of the fan casing 10 is a pipe, which establishes communication between the casing and the thresher indicated generally at 35, and this pipe while substantially of U-shape formation as shown in Figure 3, preferably includes spaced end sections 36 which are telescopically associated with an intermediate section 37; while each of the end sections are also made up of pivoted sections 38, the construction being such to permit of the vertical adjustments or movements of the hood 11 and its associated parts as above described.

From the construction and arrangement of parts thus far described, it is obvious that the hood 11 may be adjusted or arranged in proper relation to the ground or surface, and when the machine is in operation, the rotation of the fan 17 creates a suction through the hood 11, which of course raises the fallen grain above the ground, so that this grain as well as the upstanding grain can be effectively and quickly cut by the bar 13. The grain after having been cut is drawn up thru the hood 11, passing through the fan casing 10, and is conveyed to the thresher through the sectional pipe, which establishes communication between the casing 10 and the threshing machine 35.

As the grain is forced into the threshing machine by the air pressure developed by the fan, it strikes the inclined screen located directly beneath the inlet opening 39 of the thresher, from where the grain is forced beneath the toothed cylinder 40 and concave 41, passing of course, onto the sieves 42. Arranged within the thresher directly above the screen is an inclined partition 43, and projecting from this partition are spaced fingers 44, which are located with relation to the cylinder 40, to prevent the grain and straw from passing over the top of the cylinder, but on the contrary causing it to pass beneath the cylinder and the concave 41 in reaching the sieves 42. The air pressure developed by the fan, not only conveys the grain and straw into the thresher through the inlet opening 39, but also forces it beneath the cylinder 40 and the concave 41, and assists in cleaning and separating the grain as will be readily understood. The cylinder may, of course, be operated from the motor 15 if so desired, but I preferably employ a separate motor 45 indicated in Figure 1 and from which the cylinder 40 and the sieves 42 are actuated.

The screen upon which the grain and straw is initially deposited as it enters the threshing machine through the opening 39, preferably includes a fixed perforated section 46 and a slidable perforated section 47, the latter being formed with lug extensions 48 which slide through slots formed in the opposed sides of the threshing machine, and which lugs are connected with a crank shaft 49 by means of the rods or pitmen 50 as clearly illustrated in Figure 6.

The crank shaft 49 is provided with a belt pulley 51 and is, of course, operated from the motor 45, and by reason of this construction it is manifest that the movable section 47 of the screen is constantly reciprocating over the fixed section 46, thereby maintaining the screen free of any obstructions, which of course is also brought about by the passage of a certain portion of the air entering the thresher, through the perforations of the screen sections. That portion of the air which passes through the perforations in the screen sections, is allowed to escape through a door opening 52 into the thresher beneath the sieves 42 as clearly illustrated in Figure 5. It will therefore be observed that the fan 16 not only operates to create a suction to raise or elevate the fallen grain into proper position with relation to the cutter bar to be severed hereby, but the fan also operates to develop an air pressure for conveying the grain and straw into the thresher, and force the same therethrough, thereby helping to both clean and separate the grain as will be readily appreciated.

While it is believed that from the foregoing description the nature and advantages of the invention will be readily understood, I desire to have it known that I do not limit myself to what is herein illustrated and described, and that such changes may be resorted to when desired, as fall within the scope of what is claimed.

What I claim is:—

A device of the character set forth comprising a wheeled frame pivotally connected to a thresher, a power source on the frame, manually controlled and counter-balanced means for raising and lowering the frame relative to the thresher and the ground, a suction fan on the frame and operated by the power source, an elongated hood carried by the frame and connected to the fan to create a suction on the ground to lift fallen grain and straw from the ground and collect standing grain and straw, a cutting means traversing the mouth of the hood to sever the straw, and a conveyor pipe connected to the suction fan and to the thresher and including telescopic sections to permit the length of the pipe to be varied, and end pivoted sections to permit the pipe to accommodate itself to the movement between the frame and the thresher.

CLEM D. ELLIS.